(12) United States Patent
Berger et al.

(10) Patent No.: US 6,446,059 B1
(45) Date of Patent: Sep. 3, 2002

(54) RECORD FOR A MULTIDIMENSIONAL DATABASE WITH FLEXIBLE PATHS

(75) Inventors: Alexander Berger, Redmond; Amir Netz; Mosha Pasumansky, both of Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/338,207

(22) Filed: Jun. 22, 1999

(51) Int. Cl.$^7$ .............................................. G06F 17/30
(52) U.S. Cl. ................................... 707/2; 707/4; 707/5
(58) Field of Search ............................ 707/1, 2, 3, 4, 707/5, 6, 100, 102, 103, 200

(56) References Cited

U.S. PATENT DOCUMENTS

| | | | |
|---|---|---|---|
| 5,706,495 A | 1/1998 | Chadra et al. ................. | 707/2 |
| 5,710,915 A | 1/1998 | McElhiney ..................... | 707/3 |
| 5,799,300 A | 8/1998 | Agrawal et al. ............... | 707/5 |
| 5,890,151 A | 3/1999 | Agrawal et al. ............... | 707/5 |
| 5,905,985 A | 5/1999 | Malloy et al. ................. | 707/100 |
| 5,918,232 A * | 6/1999 | Pouschine et al. ........... | 707/103 |
| 5,926,820 A * | 7/1999 | Agrawal et al. .............. | 707/200 |
| 5,937,408 A | 8/1999 | Shoup et al. .................. | 707/102 |
| 5,963,936 A | 10/1999 | Cochrane et al. ............. | 707/3 |
| 6,115,714 A * | 9/2000 | Gallagher et al. ........... | 707/100 |
| 6,122,636 A | 9/2000 | Malloy et al. ................ | 707/102 |
| 6,182,060 B1 | 1/2001 | Hedgcock et al. ............ | 707/1 |
| 6,205,447 B1 * | 3/2001 | Malloy ........................ | 707/102 |
| 6,226,647 B1 | 5/2001 | Venkatasubramanian et al. ......................... | 707/102 |
| 6,282,447 B1 | 8/2001 | Cook et al. .................... | 607/9 |
| 6,282,546 B1 * | 8/2001 | Gleichauf et al. ........... | 707/102 |

OTHER PUBLICATIONS

Chatziantoniou et al. (IEEE publication, Apr. 2001) discloses the MD-join: An operator for complex OLAP, pp. 524–533.*
Chen et al. (IEEE publication, Mar. 2000) discloses a data-warehouse/OLAP framework for scable telecommunication tandem traffic analysis pp. 201–210.*
Flores, et al. (IEEE publication, Jul. 2000) discloses characterization of segmentation methods for multidimensional metrics, pp. 645–647.*
Chatziantoniou, D. et al., "The MD-join: An operator for complex OLAP", *IEEE*, 2001, 524–533.
Chen,Q.et al., "A Data-warehouse/OLAP framework for scalable telecommunication tandem traffic analysis" *HP Labs*, Palo Alto, California.
Flores–Parra,I. et al., "Characterization of segmentation methods by multidimensional metrics: Application to the delimitation of structures", *IEEE*, 2000, 645–647.

* cited by examiner

*Primary Examiner*—Diane D. Mizrahi
(74) *Attorney, Agent, or Firm*—Woodcock Washburn LLP

(57) ABSTRACT

Creating and maintaining cell data records in a multidimensional database is disclosed using flexible dimension paths is disclosed. The systems and methods of the invention define an efficient mechanism to specify a cell's location within the multidimensional database where there are hierarchies of levels within a dimension. The flexible dimension path does not change when a member is moved from a first point to a second point on a dimension thereby avoiding the need to rebuild the OLAP database. The format used lends itself well to indexing, and also to creating aggregations of the cell data.

23 Claims, 7 Drawing Sheets

RECORD FOR A MULTIDIMENSIONAL DATABASE WITH FLEXIBLE PATHS

RELATED APPLICATIONS

This application is related to the following pending applications, all of which are filed on the same day and assigned to the same assignee as the present application:

"Aggregation Design in Database Services"—Ser. No. 09/338,212 now U.S. Pat. No. 6,366,905 filed Jun. 22, 1999, "Aggregation Size Estimation in Relational and OLAP Databases"—Ser. No. 09/338,390, filed Jun. 22, 1999, "Aggregation Performance Estimation in Relational and OLAP Databases"—Ser. No. 09/337,751, filed Jun. 22, 1999, "Usage Based Aggregation Optimization"—Ser. No. 09/338,207 filed Jun. 22, 1999, and "Record for Multidimensional Database"—Ser. No. 09/338,207 filed Jun. 22, 1999.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999, Microsoft, Inc.

FIELD

The present invention pertains generally to computer-implemented databases, and more particularly to storing records in such databases.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, a dimension is a structural attribute of a cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array. Each cell contains a value, also referred to as a measurement.

One issue regarding the design of multidimensional databases is how to represent the cells in the multidimensional space. One potential design choice is to represent the multidimensional space as an array of cells, with the size of the array determined by the multiplication of the number of points in each dimension. A significant problem with this approach is that the size of the database grows exponentially as the number of dimensions and the size of each dimension increases. This leads to a rapid depletion of the physical resources such as persistent storage and RAM required to implement the database. This phenomenon is known as data explosion for multidimensional databases.

In addition, much of the space is wasted in the above-mentioned approach. Data in multidimensional databases tends to be sparse, that is, not every cell is expected to have a value associated with it. For example, consider a Store dimension having a hierarchy of Country, State, and City specifying the location of a store, and a Product dimension having a product identification and a product count measure. No store in the in the database will be expected to stock every possible product, and in fact any one store may only stock 20% of the available products. In this situation, most of the cells in the multidimensional space would contain no data, thus wasting much of the space allocated to the database.

A second issue relates to locating cells in the multidimensional space. It is desirable to be able to locate cells quickly in order to provide acceptable system throughput. Representing the cells as a multidimensional array provides for rapid access to the cells, but has the data explosion problem mentioned above.

A third issue relates to the capability to perform aggregations on the multidimensional data. Databases are commonly queried for aggregations (e.g. summaries, minimums, maximums, counts etc.) of detail data rather than individual data items. For example, a user might want to know sales data for a given period of time without regard to geographical distinctions. These types of queries are efficiently answered through aggregations. Aggregations are precomputed summaries of selected detail data that allow an OLAP system or a relational database to respond quickly to queries by avoiding collecting and aggregating detailed data during query execution. Without aggregations, the system would need to scan all of the rows containing the detailed data to answer these queries, resulting in potentially substantial processing delays. With aggregations, the system computes and materializes aggregations ahead of time so that when the query is submitted to the system, the appropriate summary already exists and can be sent to the user much more quickly. Calculating these aggregations, however, can be costly, both in terms of processing time and in terms of disk space consumed.

A third issue relates to the stability of the members of a dimension hierarchy. Stability refers to the propensity for members to move from one point in the dimension hierarchy to another. Some types of dimensions are very stable. For example, hierarchies in the time dimension are very stable, as there is no need to move a month from one year to the next.

However, other hierarchies tend to be much less stable, and members frequently move from point to point in the dimension hierarchy. As an example, consider a customer dimension having a hierarchy of Country, State, City, Customer, where a customer is located in a particular city of a particular state within a particular country. It is quite likely that at some point in time, a customer will move from one city to another, possibly in a different state, and perhaps to a different country.

In previous systems, the movement of a member from one point in a hierarchy to another point results in the entire OLAP database having to be rebuilt to reflect the new hierarchy. Completely rebuilding the database typically takes a large amount of time and system resources, especially for OLAP databases with large numbers of detail records.

Thus there is a need for a system that stores cell data for a multidimensional database in an efficient manner. Additionally, there is a need for such a system that allows members to move from one point to another without causing the database to be rebuilt. Moreover, there is a need for such a system that provides the ability to locate cells rapidly and efficiently. Finally, there is a need for such a system that is able to perform aggregations in an efficient manner.

SUMMARY

The above-mentioned shortcomings, disadvantages and problems are addressed by the present invention, which will be understood by reading and studying the following specification.

The systems and methods described herein create and maintain cell data records in an OLAP database system. One aspect of the system is that cell data records are created that contain a system path. The system path is comprised of one or more dimension paths that define the location of a cell in a multidimensional database. The dimension path can be a flexible dimension path or it can be a rigid dimension path. Flexible dimension paths map a unique member id to a rigid dimension path maintained outside of the system path. This allows a member to move from one location to another in the dimension hierarchy without changing the system path, thereby avoiding a rebuild of the OLAP database. Rigid dimension paths map directly to a member of a level in the dimension hierarchy. The format used for the dimension paths provides an efficient mechanism for locating the cell, and in addition, can be indexed easily to allow rapid location of cell data.

A further aspect of the system is that the format of the system path provides an efficient mechanism for creating aggregations. Flexible dimension paths that are in the dimension levels that are to be aggregated are converted to rigid dimension paths. The rigid dimension paths have their corresponding member index set to a null value in the dimension path of each record. The records are then scanned for a match to a system path representing the aggregation. Those that match have their measure data included in the aggregation.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an exemplary cube for an OLAP system is described. In the third section, a system level overview of an embodiment of the invention is presented. In the fourth section, methods of an exemplary embodiment of the invention are provided. Finally, in the fifth section, a conclusion of the detailed description is provided.

Hardware and Operating Environment

Figure 1:
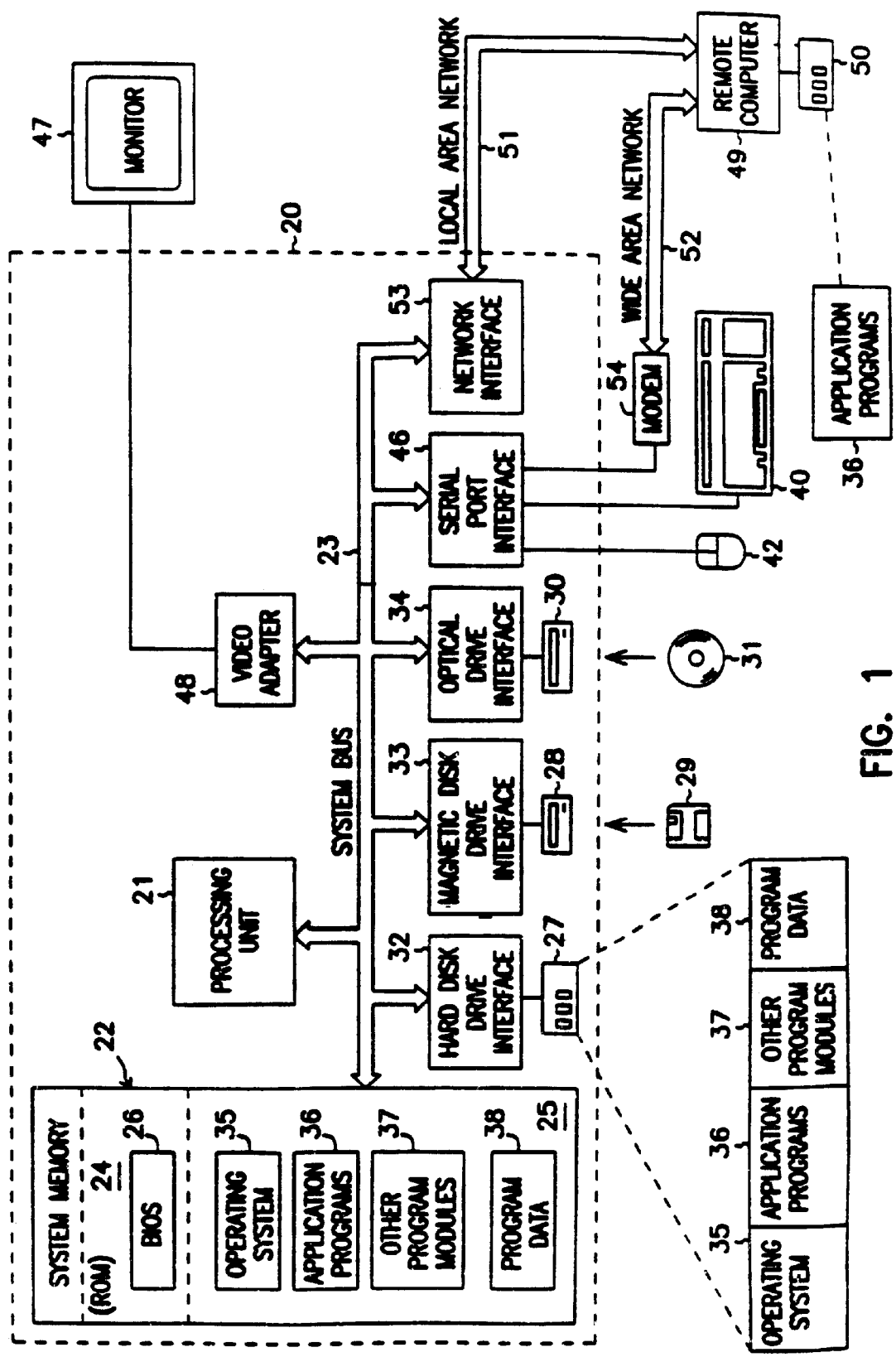
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Cube and Dimension

In the detailed description that follows, reference will be made to a small, three-dimensional OLAP cube. This cube has a Customers dimension with four levels: All, State, City and Customer. The second dimension, a Products dimension, has three levels: All, Category and Product. The final dimension is a time dimension with three hierarchy levels: year, quarter, and month. In addition, the cube has two measures, Purchases and Units. This cube is presented to provide a reference example of how the systems and methods of the invention operate. It will be appreciated that the OLAP cubes maintained by various embodiments of the invention can have more or fewer dimensions than in this example, and that the OLAP cube can hove more or fewer hierarchy levels than in this example.

Figure 2A:
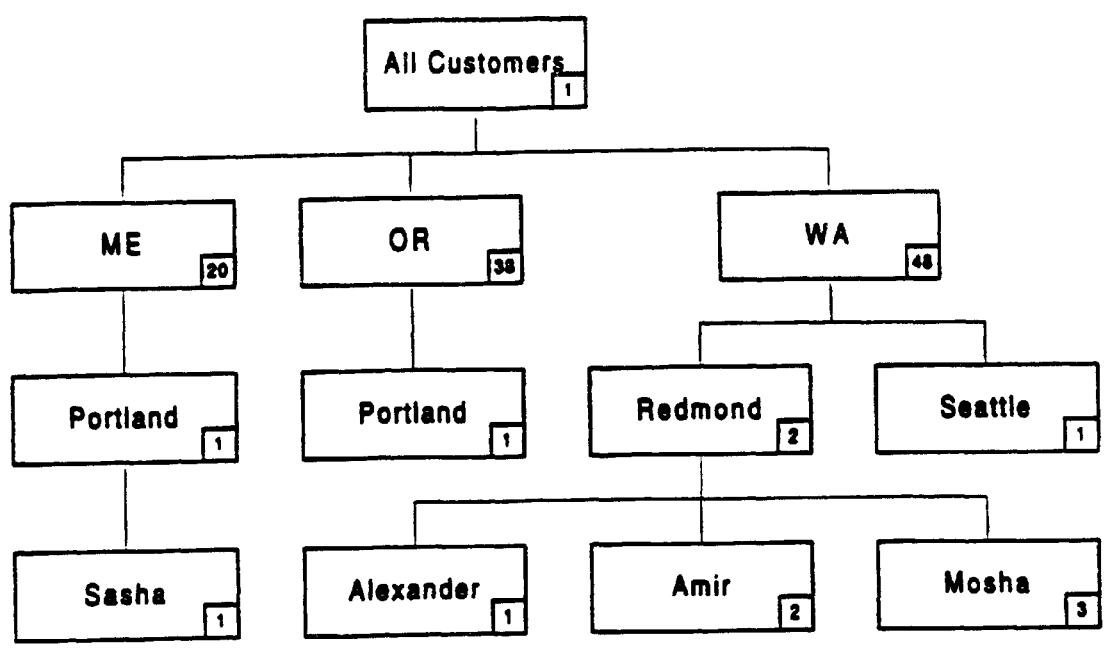
FIGS. 2A–2C are diagrams illustrating an exemplary dimension hierarchy within a multidimensional database.
Figure 2B:
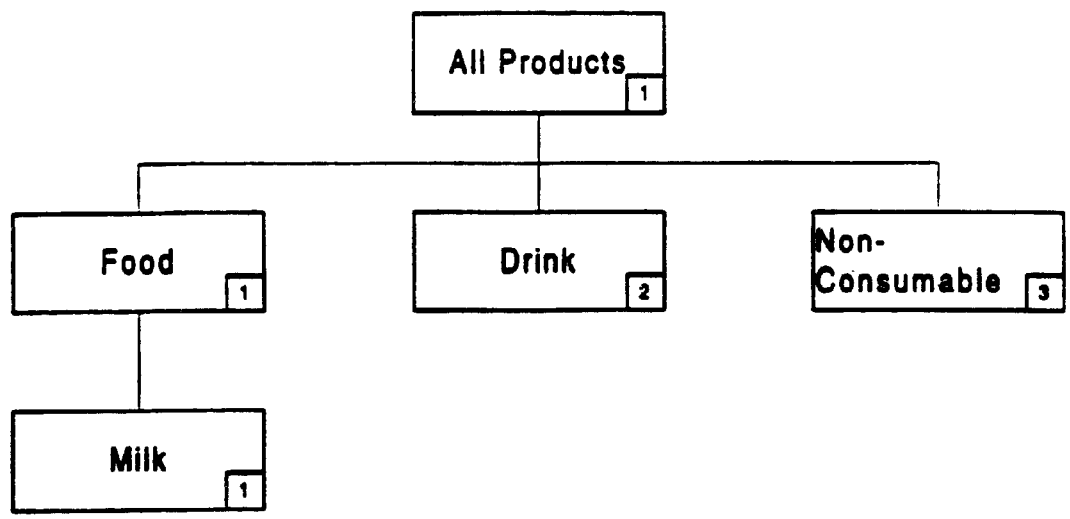
Figure 2C:
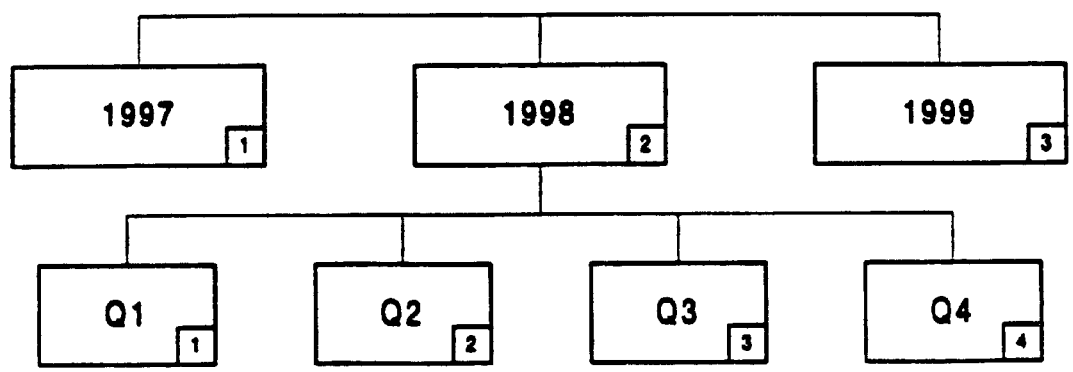

A graphical representation of the dimensions in the above-described cube is presented in FIGS. 2A–2C. A dimension is represented as a tree, referred to as a dimension tree. Leaf nodes in the tree correspond to the most detailed data in the dimension, while the inner branch nodes correspond to more aggregated data. The closer the node is to the root node, the more aggregated the data, with the root node representing the most aggregated, least detailed data in the dimension.

The Customer dimension is represented in FIG. 2A. In this exemplary representation, the State level has three members: Maine, Oregon and Washington. The Cities level has four members: Portland (Me.), Portland (Oreg.), Redmond and Seattle. It should be noted although a member labeled Portland appears twice, each member is a distinct reference because it appears under a different State member in the hierarchy. The Customer level has four members: Sasha, Alexander, Amir and Mosha.

The Products dimension is represented in FIG. 2B. In the exemplary representation, the Category level has three members: Food, Drink, and Non-Consumable. The Product level has one member, Milk.

The Time dimension is represented in FIG. 2C. In the exemplary representation, the Year level has three members: 1997, 1998, and 1999. The Quarter level has four members: Q1–Q4. The Month level has no members, indicating that no monthly data is available. In this case, the most detailed data available is at the Quarter level.

In order to uniquely identify a particular member, each of the members from the root node to the leaf node for the member must be specified. For example, in order to refer to the customer Amir in the Customers dimension shown in FIG. 2A, the following sequence of members is specified: {All Customers}. {WA}. {Redmond}. {Amir}. Similarly, to refer to Quarter 2 in the Time dimension shown in FIG. 2C, the members specified are: {1998}. {Q2}.

Those of skill in the art will appreciate that the members shown in FIGS. 2A–2C represent an exemplary cube and that no embodiment of the invention is limited to a particular number or type of dimensions or dimension members.

In the above example, strings representing member names are used to designate a particular member of a dimension. In an embodiment of the invention, the strings above are replaced by numbers associated with each member in a dimension. It is desirable to represent the members using numbers, as it is more efficient to represent objects using numbers rather than strings. In this embodiment, a path from the root node to a branch node is represented by the member number at each level of the dimension that is traversed to reach the leaf node. The number assigned to each member must be unique among the members having a common parent, in other words, a unique number must be assigned to each of the siblings of a parent node. In one embodiment of the invention, the root node is assigned the number 1 while branch and leaf nodes are assigned a number representing their order among their siblings. However the invention is not limited to any particular numbering scheme for the node, all that is required is that the number be unique among the nodes having a common parent.

Thus, each member in a dimension can be represented by an array of numbers defining the path to the member. This array is the dimension path. The number of elements in the array is the number of levels in the dimension, and the position in the array reflects the hierarchy of levels. For example, referring to FIG. 2A, the representation for member Amir in the Customers dimension is the dimension path {1-48-2-2}. This represents the path comprising the root node All Customers (1), the WA member at the state level (WA is the 48$^{th}$ state alphabetically), the Redmond member at the city level (Redmond is the second city at that level under WA), and the member Amir at the customer level (Amir is the second customer under Redmond). Note that each level must be represented by a number in the array, if the member is not at a leaf node, the number 0 is used in one embodiment of the invention to represent the positions for the levels below the member. Thus the dimension path array for the member Portland, Oreg. in the Customer dimension is {1-38-0-0}.

Not all dimensions have a single root member. For example, consider the Time dimension of the exemplary cube. There is no single "all time" member at the top-most level in this dimension, rather the Time dimension contains three members, each specifying a particular year. In this case, one embodiment of the invention assigns an index number to each member in the top-most level based on a natural order of the members. This natural order can be based on a numeric order, an alphabetic order, or the temporal order in which the members were created. For instance, in FIG. 2C, the dimension path for Q3 in the year 1998 is {2-3-0} (1998 is the second year at the top-most level, Q3 is the third member under 1998, and there are no month members).

The dimension paths described above are referred to as rigid dimension paths, because they do not allow a cell to change its position within the dimension hierarchy. This is because the indexing scheme used directly maps to a particular point in the hierarchy, and cannot map to any other point without changing at least one of the index components.

Flexible dimension paths offer an alternative to rigid dimension paths that allows a cell to change its position in the hierarchy. In order to implement flexible paths, a system must maintain a mapping from a rigid dimensional path to a unique identifier associated with a cell member. For example, the table below illustrates a mapping for the Customer dimension members provided above.

TABLE 1

| Customer | Id | Rigid Dimension Path |
| --- | --- | --- |
| Alexander | &14 | {1-48-2-1} |
| Amir | &15 | {1-48-2-2} |
| Mosha | &16 | {1-48-2-3} |
| Sasha | &17 | {1-20-1-1} |

Each data cell in a multidimensional database is uniquely identified by specifying a coordinate on each dimension. In one embodiment of the invention, a cell is identified by specifying a dimension path for each dimension in a cube in the multidimensional database. The dimension path can be either a rigid or flexible dimension path. The collection of dimension paths comprising the coordinates for the cell are concatenated and stored in an array referred to as the system path. In an embodiment of the invention, the order of dimension paths in the system path is dependent on the internal order of the dimensions in the cube, as determined by the metadata defining the cube. However, the invention is not limited to a particular ordering scheme and other ordering schemes are possible and within the scope of the invention. For example, the order of dimension paths could be determined alphabetically by the name of the dimension.

To illustrate the system path described above, consider the cell associated with the customer Amir for All Products in Quarter 4 of 1998. The string representation for the cell path is: ({Customers}. {All_Customers}. {WA}. {Redmond}. {Amir}, {Products}. {All Products}, {Time}. {1998}. {Q4}). The corresponding system path using rigid dimensional paths is: {1-48-2-2}-{1-0-0}-{2-4-0}.

The same system path can be represented using a flexible dimension path as {&15}-{1-0-0}-{2-4-0}. In this case, when the cell is accessed, the accessor must consult the mapping table to determine the correct cell location for the dimension represented by a flexible path. In the example above, only one dimension has a flexible path. However the invention is not so limited, and the number of flexible paths appearing in a system path is not fixed to any particular number. It is desirable to differentiate the flexible path from a rigid path containing only one level, thus a flexible path is introduced by a distinguishing character. In one embodiment of the invention, the distinguishing character is the "&", however the invention is not limited to any particular distinguishing character or set of characters. Now assume that Amir moves from Redmond to Seattle. In this case, his rigid dimensional path changes from {1-48-2-2} to {1-48-1-1}. However, his flexible dimension path remains the same (&15). Thus, as can be seen from the above example, the database need not be rebuilt when a member moves from one point in the hierarchy to another, because the system path to the cell does not change. The change is to the mapping in the map table, not the path in the local store.

Figure 3:
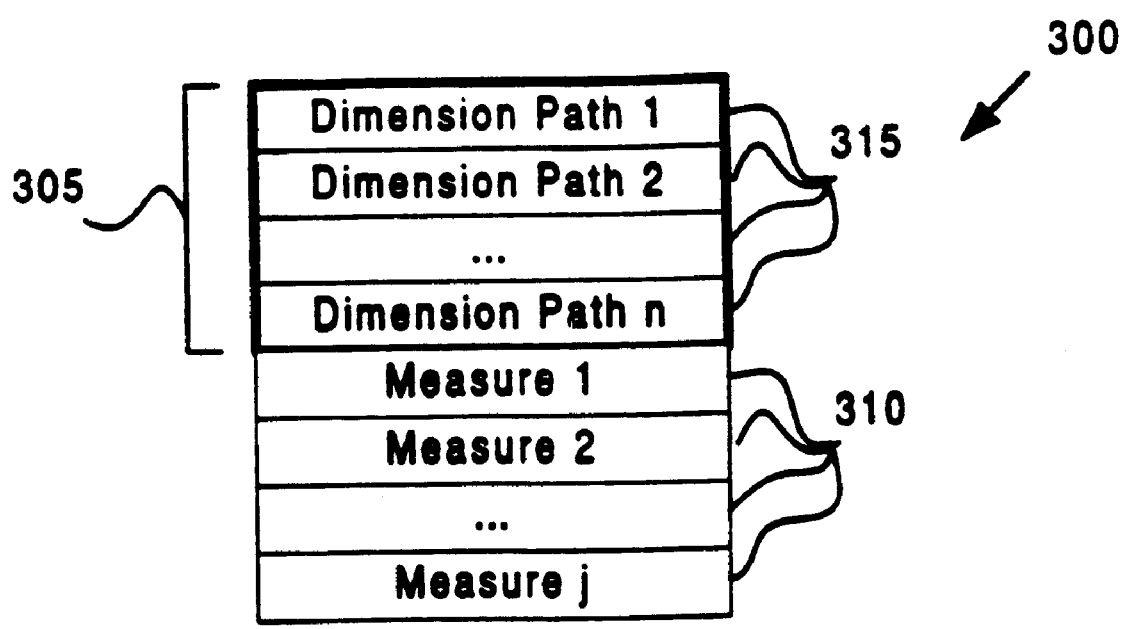
FIG. 3 is a diagram illustrating a record structure for a cell data record according to an embodiment of the invention.

In addition to a system path, each cell in a multidimensional database has one or more measures associated with it. In the exemplary cube, two measures are defined, Purchases and Units, where Purchases is the dollar amount of a particular purchase, and Units is the number of units purchased. FIG. 3 illustrates a data structure for a cell record 300 according to one embodiment of the invention. Cell record 300 contains a system path 305 and one or more measures 310. As described above, system path 305 comprises one or more dimension paths 315. The dimension paths can be either flexible dimension paths or rigid dimension paths. The order of measures 310 in record 300 can be determined by the order of the measures in the metadata defining the cube, the temporal order in which the measure were defined, or an alphabetic order. The invention is not limited to any particular ordering mechanism.

This section of the detailed description has described a representation of cells in a multidimensional database, and a data structure for storing a cell record. In the sections that follow, systems and methods for creating and manipulating the cell data will be described.

System Level Overview

Figure 4:
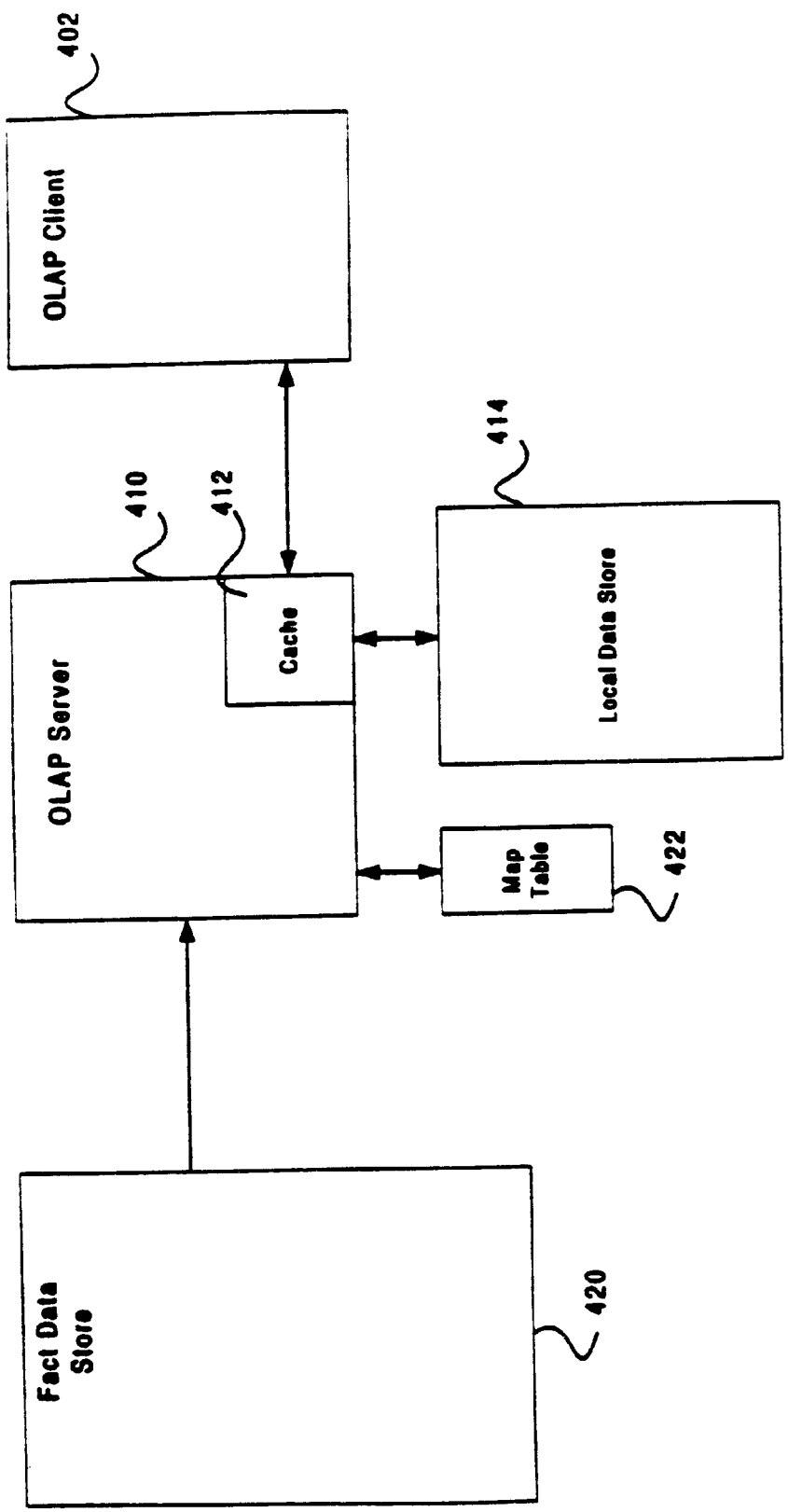
FIG. 4 is a system level overview of various embodiments of the invention.

A system level overview of the operation of an exemplary embodiment of the invention is described by reference to FIG. 4. The concepts of the invention are described as operating in a multiprocessing, multithreaded virtual memory operating environment on a computer, such as computer 20 in FIG. 1. The operating environment includes an OLAP client 402, OLAP server 410, local data store 414, and fact data store 420, all of which operate on the cell records for cubes, including the records and cube described in the previous section.

OLAP client 402 is an application program that requires the services of an OLAP system. OLAP client 402 can be any type of application that interacts with the OLAP system, for example, a data mining application, a data warehousing application, a reporting application etc. OLAP client 402 typically interacts with OLAP server 260 by issuing OLAP queries. These queries are parsed, as is known in the art, into a request for data from a cell or range of cells, and the request is passed to the OLAP server 410.

OLAP server 410 receives queries and controls the processing of queries. In one embodiment of the invention, the server maintains a local store 414 that contains the cell data used to answer the queries. In one embodiment of the invention, the OLAP server 410 is a version of the SQL Server OLAP product from Microsoft Corporation.

The local store 414 contains records describing the cells that are present in a multidimensional database, with one record used for each cell that actually has measurement data present (i.e. no records exist for those cells having no measurement data). The general format of these records is described above with reference to FIG. 3. In one embodiment of the invention, local store 414 is a relational database, such as SQL Server. In this embodiment, records are stored in a relational table. This table can be indexed based on the dimensional paths of the record to allow rapid access to cell measurement data contained in the record. The indexing can be performed using hash indexing or AVL tree indexing as is known in the art.

OLAP server 410 populates local store 414 by reading data from fact data store 420. Fact data store 420 is also a relational database system. In one embodiment of the invention, the system used is the SQL Server Database from Microsoft Corporation. In alternative embodiments of the invention, database systems such as Oracle, Informix or Sybase can be used. The invention is not limited to any particular type of relational database system.

OLAP server 410 reads the fact data (also known as detail data) from fact data store 420 at predetermined times, and converts the fact data into cell data records for populating local data store 414. In one embodiment of the invention, the fact data is read once during a 24 hour period, typically during a time when the fact data store is not busy responding to user queries. In an alternative embodiment of the invention, the fact data is read and converted when a system administrator issues a command to the OLAP server 410 to do so. Updates to the local data store 414 can be incremental, or they can result in a complete refresh of the data. Incremental updates are desirable, because only the data that has changed in fact data store 420 need be converted and added to local data store 414. However, if the structure of the data in either fact data store 420 or local data store 414 changes, then a complete refresh is required. The frequency of updates to the local store 414 will generally be determined by user requirements as to how current (or accurate) the cell data must be, and the volume of data that must be updated.

OLAP server 410 also maintains a map table 422. The map table 422 is used to maintain mappings from rigid dimensional paths to unique member identifiers. The OLAP server 410 uses the map table to determine whether or not a flexible path can be constructed when a new cell record is added to local store 414.

In one embodiment of the invention, the OLAP server 410 maintains a cache 412 of cell records. In this embodiment, the cache maintains cell data records that have been recently requested, or those cell data records that are frequently requested. Maintaining cell record data in a cache is desirable, because it provides quicker responses to queries that can be satisfied by records appearing in the cache.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 5 and 6. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 5 and 6 are inclusive of the acts required to be taken by an operating environment executing an exemplary embodiment of the invention.

Figure 5:
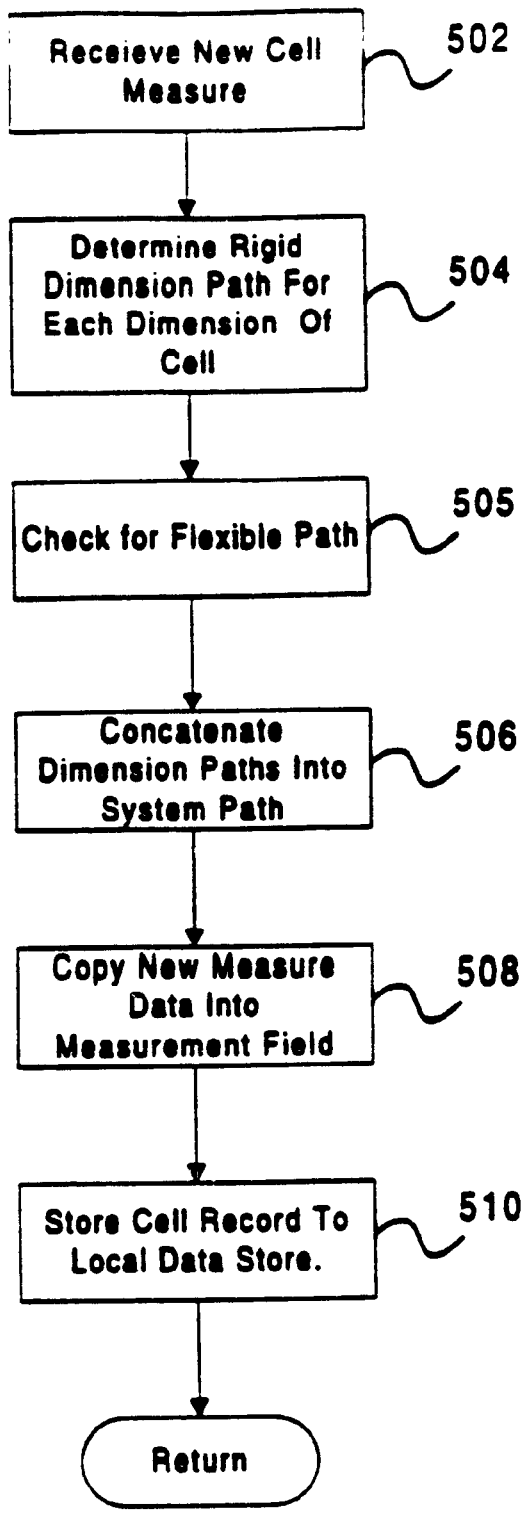
FIG. 5 is a flowchart illustrating a process for creating a cell data record according to an embodiment of the invention.
Figure 6:
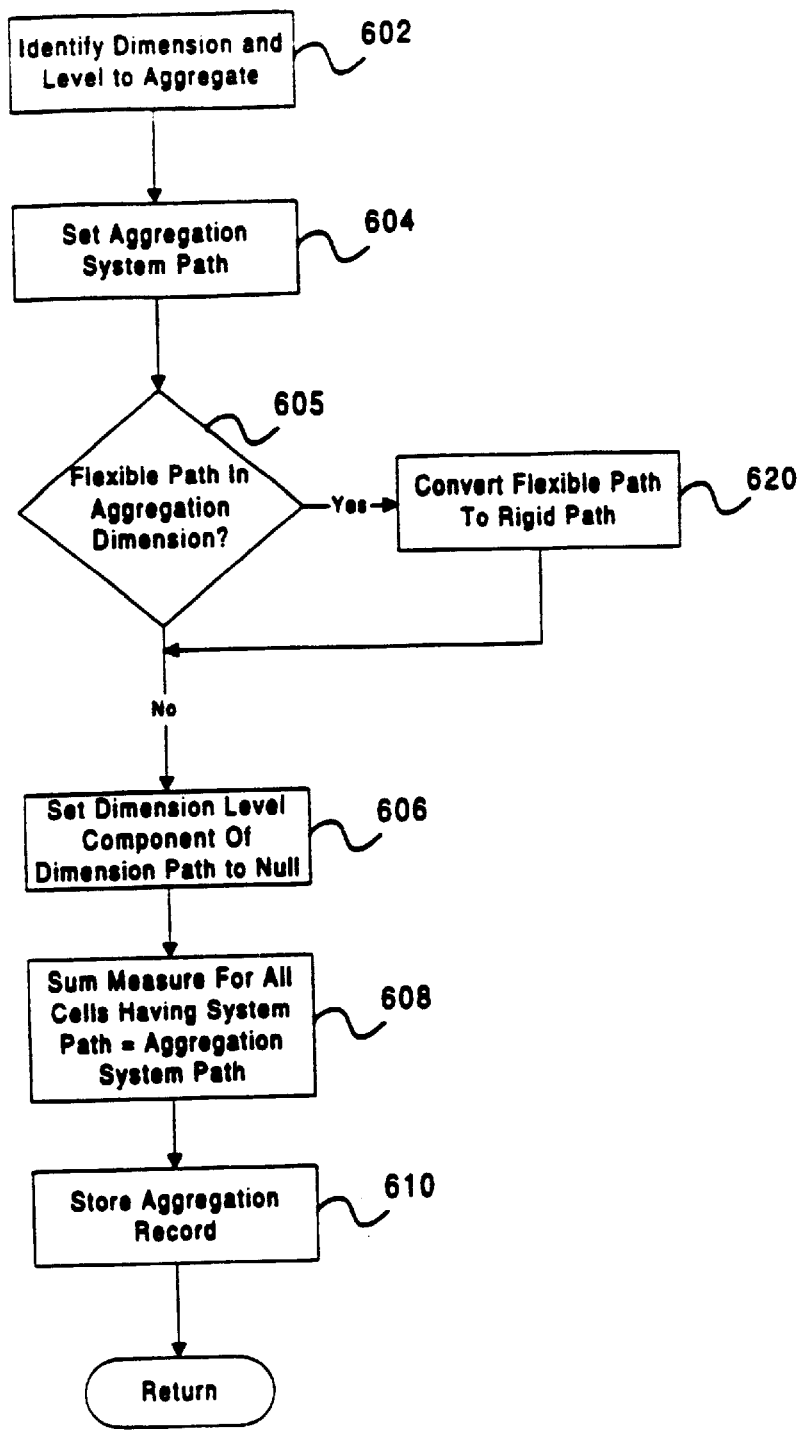
FIG. 6 is a flowchart illustrating a process for calculating an aggregation according to an embodiment of the invention.

A method for creating a cell data record is illustrated in FIG. 5. The method begins when a program executing the method, such as OLAP server 420, discovers that a new cell is required, and receives a value to be used for the measure of the new cell (block 502). Typically the new cell will be required because OLAP Server 410 has discovered that a new row has been added to a detail table in a fact data store 420 (FIG. 4) since the last update of the local data store 414.

Next, the program determines the rigid dimension path for each dimension in the cube to which the cell belongs (block 504). As discussed above, cells are located by specifying members in each dimension of the cube. The members will reside at a particular level of a dimension tree formed by the levels of the dimension and the members at each level. In one embodiment of the invention, the rigid dimension path is an array of ordinal numbers, one for each level in the dimension. The position of each ordinal number in the array is determined by the position of the level in the dimension hierarchy. The ordinal number at a position is determined by an ordering of the members at the particular level represented by the position that have a common parent. If the new cell is not a leaf node, then a value of 0 is used in the rigid dimension path to represent each of the levels below the new cell.

The program then checks a map table to determine if any of the rigid dimensional paths created at block 504 can be converted into a flexible dimensional path (block 505). If any mappings exist that match a rigid dimensional path, the rigid dimensional path is replaced with the unique member id that becomes the flexible path. A distinguishing character is included to indicate that the dimensional path is a flexible path. In one embodiment of the invention, the distinguishing character is the "&" character.

The program then proceeds to concatenate the dimension paths, both flexible and rigid, formed at block 504 into a system path for the new cell record (block 506). The ordering of the dimension paths in the system path is determined by order the dimensions are defined in the cube metadata. In alternative embodiments of the invention, the order is determined by a temporal order, or an alphabetic order.

Next, the measure data is copied into an appropriate field in the cell record (block 508). The cell record contains a field for each measure present in the cube. The ordering of measures within a record is also determined by the metadata defining the cube.

Finally, the cell record is stored in the local data store (block 510). In one embodiment of the invention, the cell record is stored as a row of a relational database. The row can be indexed by the system path, allowing subsequent queries requiring the cell's measures to find the cell quickly.

FIG. 6 shows a method for creating an aggregation of cell data records created using the method described above in reference to FIG. 5. Table 1 below provides an exemplary set of data that will be used to demonstrate the results of executing the method. The system paths shown in Table 1 are created using the dimensions of the multidimensional database illustrated in FIGS. 2A–2C. Table 1 contains four records created as described above in reference to FIG. 5. The Member column shows the name of the member in the customer dimension, the System Path column shows the system path corresponding to the cells location in the customer, product and time dimensions (in that order). The third column shows the Product Sales measure for the cell referenced by the system path. The four records represent sales to four customers, Sasha, Alexander, Amir and Mosha for all products in the fourth quarter of 1998. Note that the dimension path for the Customer dimension is a flexible path.

TABLE 2

| Member | System Path | Product Sales |
|---|---|---|
| Alexander | {&14}-{1-0-0}-{2-4-0} | $3,000.00 |
| Amir | {&15}-{1-0-0}-{2-4-0} | $2,500.00 |
| Mosha | {&16}-{1-0-0}-{2-4-0} | $5,000.00 |
| Sasha | {&17}-{1-0-0}-{2-4-0} | $8,000.00 |

A program executing the method, such as OLAP server 410, begins by identifying a dimension and level to aggregate (block 602). Typically this will be in response to a request to create an aggregation. The request may come from a system administrator, or it can be a system generated request. As an example, consider a request to aggregate all of the customer sales in Redmond, Wash. in the fourth quarter of 1998.

In response to the request, the system then creates a system path for the aggregation record using the dimensions and levels specified in the request (block 604). For the example case, the aggregation system path is {1-48-2-0}-{1-0-0}-{2-4-0}.

The program then proceeds to check if any flexible paths are present in the dimension that is to be aggregated (block 605). If there are any flexible paths in the dimension to be aggregated, the program proceeds to convert the flexible path to a rigid path (block 620). This is necessary, because the method requires the ability to manipulate the individual member index in the dimension path that corresponds to the level that is to be aggregated. In the example below, Table 3 reflects the fact that the flexible paths had to be converted to rigid paths in order to perform the aggregation.

Flexible paths that exist in non-aggregated dimensions are left unaltered. This provides the advantage that aggregations can be maintained based on the flexible path. As an example, assume that Amir initially exists in the database as a customer in Redmond. During his stay in Redmond, Amir purchases a number of products, which are aggregated. Amir then moves to Seattle, and continues to purchase more products. By leaving flexible paths in non-aggregated dimensions, the database can produce a single aggregation for Amir that includes products purchased in both Redmond and Seattle. This behavior is typically more desirable then the behavior that occurs with rigid paths. In the rigid path case, two aggregations are created, one for Amir in Redmond, and the other for Amir in Seattle.

After checking for flexible paths in aggregated dimensions, the system scans the local data store containing the cell data records, and "nullifies" (sets to null) the level numbers in the dimension paths for those levels at or below the levels are to be aggregated (block 606). Table 3 shows the results of nullifying the appropriate level numbers.

TABLE 3

| Member | System Path | Product Sales |
|---|---|---|
| Alexander | {1-48-2-0}-{1-0-0}-{2-4-0} | $3,000.00 |
| Amir | {1-48-2-0}-{1-0-0}-{2-4-0} | $2,500.00 |
| Mosha | {1-48-2-0}-{1-0-0}-{2-4-0} | $5,000.00 |
| Sasha | {1-20-1-0}-{1-0-0}-{2-4-0} | $8,000.00 |

Next, a program executing the method sums the desired measure for all cell records where the system path of the cell record matches the system path of the aggregation record (block 608). In the example shown above, the aggregation record is:

{1-48-2-0}-{1-0-0}-{2-4-0} {$10500.00}

This aggregation reflects the fact that system paths for Customer members Alexander, Amir and Mosha matched the aggregation system path.

Finally, the system stores the aggregation record (block 610). In one embodiment of the invention, the aggregation record is stored in a cache maintained by the OLAP server. This is desirable, because it allows the aggregation record to be located quickly, thereby increasing system throughput.

In one embodiment of the invention, the conversion from flexible to rigid dimension paths, and the nullification of dimension path elements is accomplished using temporary buffers. The source records are kept in their original, unconverted state and the conversion, nullification, and summation operations described above are performed on copies of the source records maintained in temporary buffers. This has the advantage that there is no need to restore values in the source records after the aggregation has been performed, the system need only delete the temporary buffers.

CONCLUSION

The creation and maintenance of a cell data record having a flexible path component for a multidimensional database has been described. The systems and methods of the invention provide advantages not found in previous systems. For example, the system and methods of the invention allow members to move from one point to another in the multidimensional space without requiring a rebuild of the database. In addition, aggregations are properly maintained for members that move. Furthermore, only those cells that actually contain measure data have records allocated to them. This provides for the efficient storage of cell data, even when the cell data is sparse. In addition, the format used to specify the dimensions and levels used to locate the cell can be easily indexed to allow the cell data to be located quickly. Finally, the format of the record allows cell data to be easily aggregated.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the systems and methods have been described in the context of a multidimensional database system, the systems and method of the invention can be applied to other data that is hierarchical in nature. The terminology used in this application with respect to creating and maintaining cell records is meant to include all of these environments. Therefore, it is manifestly intended that this invention be limited only by the following claims and equivalents thereof.

We claim:

1. A computerized method for creating a cell record for a multidimensional database, the method comprising:

maintaining a set of mappings from a rigid dimension path to a unique memberid;

receiving a measurement data item for a cell, said cell identified by a first member, said first member having a first dimension and a first level;

determining a first rigid dimension path for the first member;

if the first rigid path is in the set of mappings, inserting a first flexible dimension path corresponding to the unique memberid mapped to the first rigid dimension path into a system path field of the cell record, otherwise inserting the first rigid dimension path into a system path field of the cell record; and inserting the measurement data item into a measurement field of the cell record.

2. The computerized method of claim 1, wherein determining the first rigid dimension path comprises:

determining a set of dimension members on a path between the first dimension member and a top-level member, said path including the top-level member and the first dimension member; and for each dimension member in the set of dimension members, performing the tasks of:
determining a member number, and
concatenating the member number into the first rigid dimension path.

3. The computerized method of claim 2, wherein the member number is determined by the dimension member's order among a set of siblings for the member.

4. The computerized method of claim 1, wherein the cell is further identified by a second member, said second member having a second dimension and a second level, and further comprising:

determining a second rigid dimension path for the second member; and concatenating a second flexible dimension path corresponding to the unique memberid mapped to the second rigid path into the system path field if the second rigid path is in the set of mappings, otherwise concatenating the second rigid path into the system path.

5. The computerized method of claim 4, wherein determining the second rigid dimension path comprises:

determining a set of dimension members on a path between the second dimension member and a top-level member, said path including the top-level member and the second dimension member; and for each dimension member in the set of dimension members, performing the tasks of:
determining a member number, and
concatenating the member number into the second rigid dimension path.

6. The computerized method of claim 4, wherein the member number is determined by the dimension member's order among a set of siblings for the member.

7. A computerized method for determining an aggregation measure, the method comprising:

identifying an aggregation measure and an aggregation system path, said aggregation system path specifying an aggregation dimension and an aggregation level;

if a flexible dimension path exists in the aggregation dimension then converting the flexible dimension path to a rigid dimension path;

for each record of a plurality of records, each record having a system path, said system path having a rigid dimension path, said rigid dimension path having a plurality of level components, performing the following tasks:
setting a level component corresponding to the aggregation level to a null value, and
setting each level component corresponding to a level below the aggregation level to the null value;

selecting a subset of the plurality of records where the system path equals the aggregation system path; and summing a measure corresponding to the aggregation measure in each record of the subset to create an aggregated measure.

8. The method of claim 7, further comprising restoring to a previous value each of the level components set to a null value.

9. The method of claim 8, wherein restoring to a previous value comprises rolling back a database transaction.

10. The method of claim 8, wherein an aggregation record having the aggregation system path and a measure corresponding to the aggregated measure is stored in a cache.

11. A computer-readable medium having computer-executable instructions for performing a method comprising:

maintaining a set of mappings from a rigid dimension path to a unique memberid;

receiving a measurement data item for a cell, said cell identified by a first member, said first member having a first dimension and a first level;

determining a first rigid dimension path for the first member;

if the first rigid path is in the set of mappings, inserting a first flexible dimension path corresponding to the unique memberid mapped to the first rigid dimension path into a system path field of the cell record, otherwise inserting the first rigid dimension path into a system path field of the cell record; and inserting the measurement data item into a measurement field of the cell record.

12. The computer-readable medium of claim 11, wherein determining the first rigid dimension path comprises:

determining a set of dimension members on a path between the first dimension member and a top-level member, said path including the top-level member and the first dimension member; and for each dimension member in the set of dimension members, performing the tasks of:
determining a member number, and
concatenating the member number into the first rigid dimension path.

13. The computer-readable medium of claim 12, wherein the member number is determined by the dimension member's order among a set of siblings for the member.

14. The computer-readable medium of claim 11, wherein the cell is further identified by a second member, said second member having a second dimension and a second level, and further comprising:

determining a second rigid dimension path for the second member; and concatenating a second flexible dimension path corresponding to the unique memberid mapped to the second rigid path into the system path field if the second rigid path is in the set of mappings, otherwise concatenating the second rigid path into the system path.

15. The computer-readable medium of claim 14, wherein determining the second rigid dimension path comprises:

determining a set of dimension members on a path between the second dimension member and a top-level member, said path including the top-level member and the second dimension member; and for each dimension member in the set of dimension members, performing the tasks of:
determining a member number, and
concatenating the member number into the second rigid dimension path.

16. The computer-readable medium of claim 14, wherein the member number is determined by the dimension member's order among a set of siblings for the member.

17. A computer-readable medium having computer-executable instructions for performing a method comprising:

identifying an aggregation measure and an aggregation system path, said aggregation system path specifying an aggregation dimension and an aggregation level;

if a flexible dimension path exists in the aggregation dimension then converting the flexible dimension path to a rigid dimension path;

for each record of a plurality of records, each record having a system path, said system path having a rigid dimension path, said rigid dimension path having a plurality of level components, performing the following tasks:
setting a level component corresponding to the aggregation level to a null value, and
setting each level component corresponding to a level below the aggregation level to the null value;

selecting a subset of the plurality of records where the system path equals the aggregation system path; and summing a measure corresponding to the aggregation measure in each record of the subset to create an aggregated measure.

18. The computer-readable medium of claim 17, further comprising restoring to a previous value each of the level components set to a null value.

19. The computer-readable medium of claim 18, wherein restoring to a previous value comprises rolling back a database transaction.

20. The computer-readable medium of claim 18, wherein an aggregation record having the aggregation system path and a measure corresponding to the aggregated measure is stored in a cache.

21. A computerized system comprising:
a processor and a computer-readable medium;
an operating environment executing on the processor from the computer-readable medium;
a map table;
a fact data store;
a local data store; and
an OLAP server executing under the control of the operating environment and operative to perform the tasks of:
reading a plurality of detail records from the fact data store,
for each of the plurality of detail records performing the tasks of:
determining a system path to the cell record, said system path including a flexible dimension record if a rigid dimension path associated with the cell record appears in the map table,
creating a cell record having a system path and at least one measure corresponding to a value from the detail record, and
storing the cell record in the local data store.

22. The computerized system of claim 21, wherein the fact data store is a relational database.

23. The computerized system of claim 21, wherein the local data store is a relational database system.

* * * * *